(12) United States Patent
Lutche et al.

(10) Patent No.: US 6,990,361 B2
(45) Date of Patent: Jan. 24, 2006

(54) LIGHT-EMITTING APPARATUS AND PORTABLE COMMUNICATIONS DEVICE HAVING SAME

(76) Inventors: Michelle R. Lutche, 4731 Whitney Ave., No. 28, Carmichael, CA (US) 95608; Michael L. O'Neal, 3485 Heron Lake La., Elk Grove, CA (US) 95758

( * ) Notice: Subject to any disclaimer, the term of this patent is extended or adjusted under 35 U.S.C. 154(b) by 531 days.

(21) Appl. No.: 10/029,617

(22) Filed: Nov. 1, 2001

(65) Prior Publication Data

US 2003/0083110 A1 May 1, 2003

(51) Int. Cl.
*H04Q 7/20* (2006.01)

(52) U.S. Cl. .................... 455/567; 455/566; 455/575.1; 455/90.3

(58) Field of Classification Search ................. 455/567, 455/566, 575.1, 90.3, 550.1, 575.8, 415, 455/421

See application file for complete search history.

(56) References Cited

U.S. PATENT DOCUMENTS

| | | | | |
|---|---|---|---|---|
| 4,491,692 A | * | 1/1985 | Lee | 362/24 |
| 4,733,127 A | * | 3/1988 | Takasu et al. | 313/500 |
| 5,555,550 A | * | 9/1996 | Kaschke | 455/566 |
| 6,144,863 A | * | 11/2000 | Charron | 455/566 |
| 6,269,256 B1 | * | 7/2001 | Nakamura | 455/567 |
| 6,600,662 B1 | * | 7/2003 | Emmert et al. | 361/814 |
| 6,771,938 B2 | * | 8/2004 | Lustila et al. | 379/376.01 |
| 2002/0019248 A1 | * | 2/2002 | Ruck | 455/566 |
| 2002/0034930 A1 | * | 3/2002 | Yamazaki et al. | 455/90 |
| 2003/0054854 A1 | * | 3/2003 | Kela et al. | 455/550 |

* cited by examiner

*Primary Examiner*—Tilahun Gesesse
(74) *Attorney, Agent, or Firm*—Catherine Ashley Straight

(57) ABSTRACT

An apparatus, for use with a portable communications device, producing a visual signal upon ringing. The portable communications device including an outer cover, a main circuit board assembly, a ringing transducer, a power source and a transducer power circuit. The transducer power circuit having a portion physically exposed and electrically conductive to provide contact points. The apparatus includes a substrate and a bus line mounted thereon. The bus line including a pair of conductors, one or more light emitting devices connected to the pair of conductors, and interconnection leads connected to the pair of conductors. A portion of the interconnection leads extends away from the substrate, and has remote end terminals arranged for contact with the contact points of the transducer power circuit. When power is switched on to the transducer power circuit, a ringing signal is produced. As the remote end terminals are electrically connected to the contact points of the transducer power circuit, power is also applied to the bus line, thereby illuminating the light emitting devices. The illumination of the light emitting devices is entirely coincident with the frequency, amplitude and duration of the ringing signal.

34 Claims, 2 Drawing Sheets

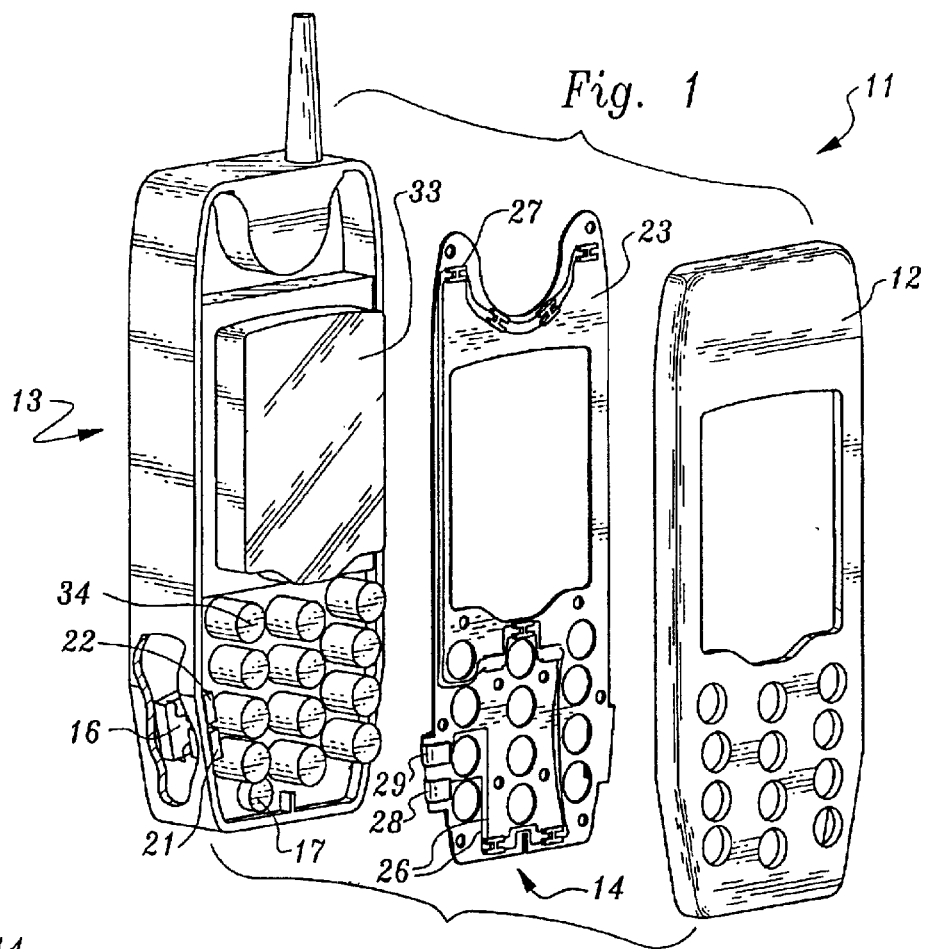
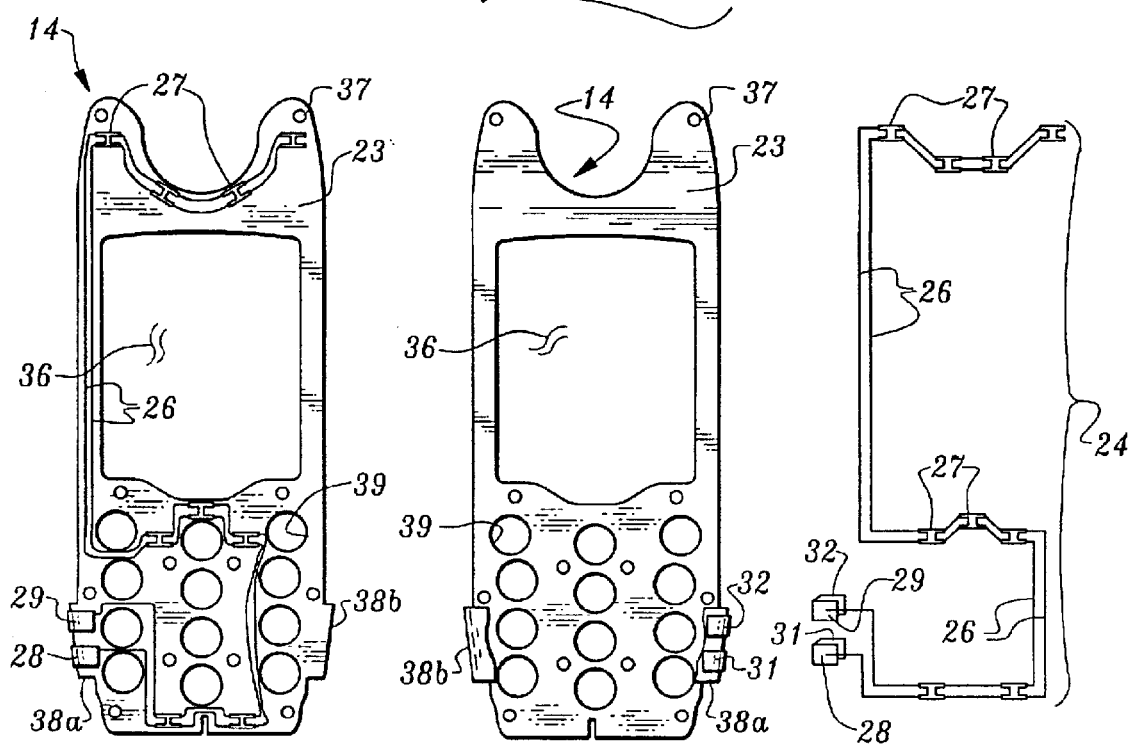
Fig. 1  Fig. 2  Fig. 3  Fig. 4

LIGHT-EMITTING APPARATUS AND PORTABLE COMMUNICATIONS DEVICE HAVING SAME

BACKGROUND OF THE INVENTION

1. Field of the Invention

The invention relates generally to an apparatus for use with a portable communications device, such as a cellular telephone. More specifically, the invention pertains to an apparatus, electrically connected to the ringing transducer power circuit of a portable communications device. The apparatus further includes one or more fights which are illuminated in coincidence with the ringing of the device. The apparatus has both new integrated construction, and retrofit configurations.

2. Description of the Prior Art

Portable communications devices, such as cellular telephones, pagers, and 2-way radios have become extremely popular and commonplace.

These portable communications devices are typically equipped with a display located on the front portion of the device. Generally, such displays are liquid crystal providing a read-out of information regarding the number dialed, elapsed talk time, channel, and signal or battery strength. In many of the available portable communications devices, the display is illuminated when the device is turned on.

There are various means used to detect an incoming call to a portable communications device, and to provide an alert to the user. Several types of alerting signals are utilized, including visual, auditory, and vibratory. All of the commercially available portable communications devices are equipped with an audible ringer or beeper. Many of these devices are also equipped with a non-auditory, vibrator to alert the user of an incoming call.

In addition, the prior art includes external accessory means to provide an alert to the user in response to an incoming call. Such call alert systems use various means to alert the user, including audible alarm, vibration and lights. However, these call alert systems are physically separated from the communications device receiving the incoming call.

SUMMARY OF THE INVENTION

The present invention provides an apparatus, adapted for use with portable communications devices, which produces a visual signal upon ringing of the device. The portable communications device may be a cellular or mobile telephone, pager or two-way radio.

In the new integrated construction version of the invention, the portable communications device includes an outer cover, a main circuit board assembly, and the apparatus. The portable communications device may also include other components which are not relevant with respect to the present invention.

All portable communications devices available commercially include a ringing transducer. The ringing transducer is a ringer, buzzer, speaker, or other component used to produce an audible signal when an incoming call is received. The term "ringing" as used in this specification is inclusive of all audible sounds produced by a ringing transducer.

The ringing transducer is interconnected to a transduced power circuit, which includes a power source and a switch. The transducer power circuit and its components are generally part of the main circuit board assembly of the portable communications device. When an incoming call is received, the switch is turned on, and electrical current flows through the transducer power circuit to the ringing transducer. An audible alert is thereby produced. The ringing produced varies in frequency, amplitude and duration. The transducer power circuit has a portion which is physically exposed and electrically conductive. This exposed, conductive portion provides first and second contact points to which an electrical connection can be made.

The apparatus includes a substrate and a bus line mounted on the substrate. The bus line includes a pair of conductors, one or more light devices connected to the pair of conductors, and interconnection leads connected to the pair of conductors. A portion of the interconnection leads extends away from the substrate, and has remote end terminals arranged for contact with the first and second contact points of the transducer power circuit. As indicated above, the ringing transducer is activated when electrical current flows through the power circuit upon ringing. As the remote end terminals of the apparatus are electrically connected to the contact points along the transducer power circuit, electrical power is also applied to the bus line, thereby illuminating the light emitting devices along the pair of conductors. The illumination of the light emitting devices is entirely coincident with the occurrence, amplitude and duration of the ringing signal.

Although only one light emitting device is required to practice the invention, the preferred embodiment employs a plurality of lights. It will be appreciated that the light emitting devices are illuminated in a light pattern which corresponds to the sound pattern produced by the transducer. The lights also illuminate with varying intensity dependent upon the frequency and amplitude of the ringing signal applied to the traducer, causing the lights to blink on and off in accordance with the ring tone of the portable communications device. The visual signal thereby produced provides an additional alert to the user of an incoming call. When the ring tone of the portable communications device is a melody, the substrate light circuitry produces a visual light pattern which is interesting and pleasing to view.

In the new integrated construction embodiment of the apparatus, the substrate may be an existing component of the portable communications device. For example, the bus line with the plurality of lights, may be mounted directly onto the underside of an outer cover or onto the upper side of the main circuit board assembly.

In a retrofit version of the invention, an apparatus is incorporated into the portable communications device as an after-market feature. In this version of the apparatus, the substrate is essentially coextensive with the shape, size, and configuration of the particular portable communications device in which the apparatus is intended to be used. The apparatus includes the specially configured substrate and a bus line mounted on the substrate. The bus line includes a pair of conductors, one or more light emitting devices connected to the pair of conductors, and interconnection leads connected to the pair of conductors. A portion of the interconnection leads extends away from the substrate, has remote end terminals, and a means for interconnecting the bus line with the power source of the transducer power circuit described in connection with the new integrated construction embodiment of the invention.

As discussed above, the transducer power circuit has a portion which is physically exposed and electrically conductive, providing first and second contact points to which an electrical connection can be made. The remote end terminals of the apparatus are sized and positioned to be in contact with these contact points when the particular portable communications device is retrofitted with the apparatus.

In order to retrofit the portable communications device with the apparatus, an outer cover, generally the front cover, is removed. The apparatus is then placed between the outer front cover and the main circuit board assembly. The first and second remote end terminals of the bus line are press-fitted into electrical contact with the first and second contact points of the transducer power circuit. The outer front cover is then reinstalled over the apparatus and the main circuit board assembly. After the retrofit is completed, the lights of the apparatus are illuminated in the same manner as discussed above.

These and other objects and features of the present invention will become apparent in the detailed description and the accompanying drawings to follow.

BRIEF DESCRIPTION OF THE DRAWINGS

FIG. 1 is an exploded, perspective view of a portable communications device including the main circuit board assembly and a cover, fitted with the apparatus of the present invention;

FIG. 2 is a top plan view of the apparatus;

FIG. 3 is a bottom plan view of the apparatus;

FIG. 4 is a pictorial diagram of the electrical circuitry of the apparatus;

DETAILED DESCRIPTION OF THE PREFERRED EMBODIMENT

Figure 5:
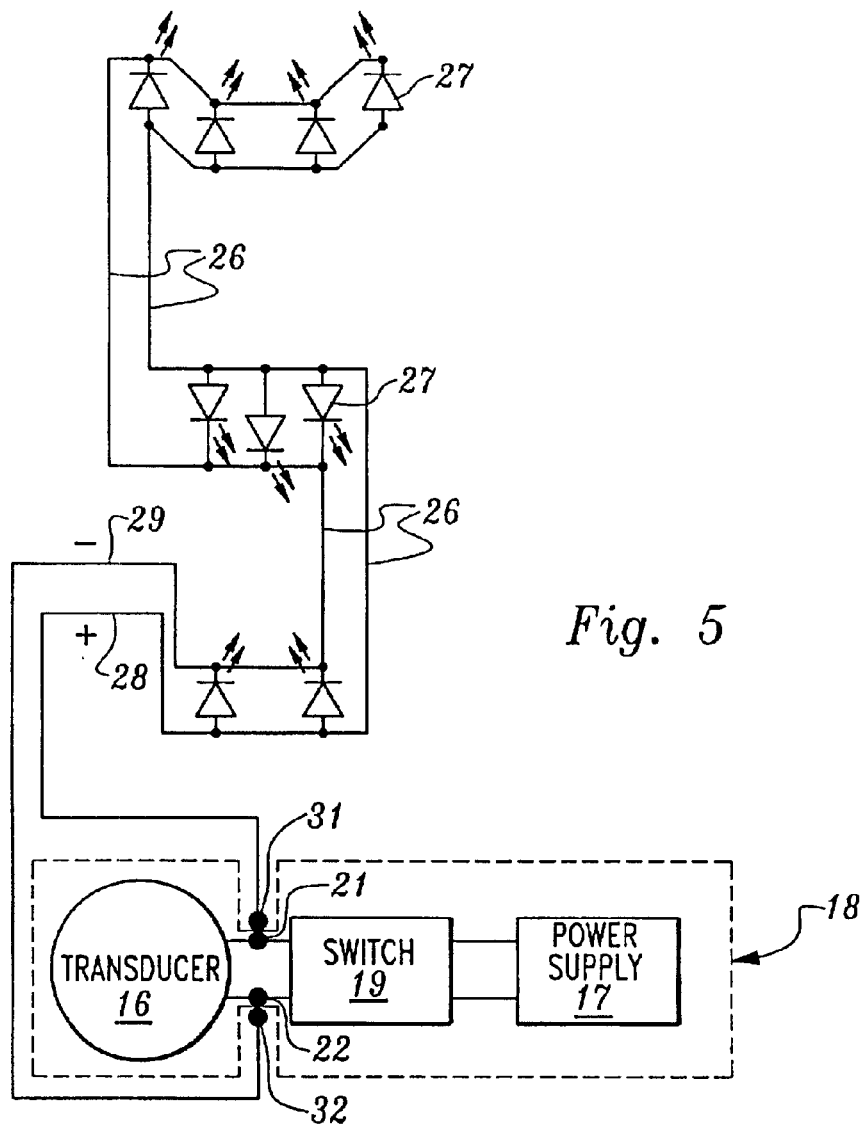
FIG. 5 is a schematic diagram of the electrical circuitry, or bus line, of the present invention, in combination with the transducer and transducer power circuit of a portable communications device.

Turning now to FIG. 1, the integrated embodiment of the present invention is shown. Portable communications device 11 includes an outer cover 12, a main circuit board assembly 13, and an apparatus 14 placed therebetween. The main circuit board assembly 13 includes a transducer power circuit 18, having a ringing transducer 16, a power source 17, and a switch 19 (shown in FIGS. 5 and 6). A portion of the transducer power circuit 18 is physically exposed and electrically conductive. The physically exposed portion of transducer power circuit 18 provides first and second contact points 21 and 22 (see FIG. 6 for detail).

The portable communications device 11 shown in FIG. 1 is a cellular telephone. Other devices with which apparatus 14 may be integrated include pagers and two-way radios. It should be noted that, while a ringing transducer 16, power source 17, transducer power circuit 18, and switch 19 are components of all of the portable communications devices, the placement of such components within a particular device varies with the device. Further, in FIG. 1, in order to simplify the drawing, many of the components of the main circuit board assembly 13 are not illustrated because they have no particular relevance to this embodiment.

Apparatus 14, also shown in FIGS. 2 and 3, includes a substrate 23, and a bus line 24. As shown in FIG. 4, bus line 24 includes a pair of conductors 26 mounted on substrate 23, and a plurality of light emitting devices 27 connected along the pair of conductors 26. Apparatus 14 also includes means to connect bus line 24 to the transducer power circuit 18. First and second interconnection leads 28 and 29 are connected respectively to one of the pair of conductors 26. A portion of interconnection leads 28 and 29 extend away from substrate 23. Interconnection leads 28 an 29 have first and second remote end terminals 31 and 32, which are sized and positioned be in contact with the first and second contact points 21 and 22, respectively, when substrate 23 is integrated with the main circuit board assembly 13 (see FIG. 1).

The ringing transducer 16, may be a ringer, buzzer, speaker, or other component which produces an audible sound. As indicated, the transducer power circuit 18 includes the power source 17, and the switch 19 to turn power to the ringing transducer 16 on and off. When an incoming call is received by the portable communications device 11, the power source 17 is switched on, power passes through transducer power circuit 18, the ringing transducer 16 is activated, thereby producing a ringing sound. The ringing produced varies in frequency, amplitude and duration. As first and second remote end terminals 31 and 32 of bus line 24 are respectively connected to first and second contact points 21 and 22 of the transducer power circuit 18, power also passes through bus line 24. The power passing through bus line 24 causes the light emitting devices 27 to be illuminated. When voltage to ringing transducer 16 drops, voltage to bus line 24 drops in a corresponding manner, and the illumination of the light emitting the light emitting devices 27 lessens. When voltage to ringing transducer 16 terminates, voltage to bus line 24 also terminates, and the light emitting devices 27 cease to be illuminated.

Accordingly, as power to the ringing transducer 16 is switched on and off, or increased or decreased, power to the light emitting devices 27 is also switched on and off, or increased or decreased. The light emitting devices 27 thereby illuminate in a manner which corresponds entirely to the ring tone pattern produced by ringing transducer 16. At least one light emitting device 27 must be connected to the pair of conductors 26. Otherwise, however, the number of light emitting devices 27 may be few or many. The placement pattern of the light emitting devices 27 along the pair of conductors 26 may also be varied to produce a random pattern or any of a number of shapes, such as oval or heart, when light emitting devices 27 are illuminated.

As illustrated in FIG. 1, substrate 23 is fabricated to be essentially coextensive with the shape, size and configuration of the main circuit board assembly 13. It will be appreciated that substrate 23 may be fabricated in several other shapes, sizes and configurations, partially dependent upon the particular portable communications device 11 in which apparatus 14 is integrated.

Portable communications device 11 also includes a display 33 and call buttons 34. The size, shape, and location of display 33, and the number and position of call buttons 34, varies dependent upon the particular portable communications device 11. Substrate 23 is shown with a cut-out 36 to allow display 33 to be viewed unobstructed when the apparatus 14 is integrated with the main circuit board assembly 13. Substrate 23 is also shown with holes 39 to pass call buttons 34 and allow for use of call buttons 34 in an unimpeded manner. Cut-out 36 and holes 39 in substrate 23 as shown in FIGS. 1, 2 and 3 are representative only. It will be appreciated that several other configurations of cut-out 36 and holes 39 exist. It also should be noted that other means exist to accomplish the same objectives, such as use of transparent material to allow unobstructed view of display 33, and use of flexible material formed to cover call buttons 34.

In FIG. 2, a surface of substrate 23 is shown. In the preferred embodiment, substrate 23 is made of a thin, flexible material. The substrate 23 material is easily cut, perforated and formed. The pair of conductors 26 is mounted onto substrate 23 by means of an adhesive tape. It should be noted that other means for mounting the pair of conductors 26 to substrate 23 exist, including other adhesives, mounting between two substrate layers, encasing under a thin plastic film, and heating substrate 23 to a melting point prior to mounting the pair of conductors 26 thereon. The light emitting devices 27 are interconnected along the pair of conductors 26 in various places by means of soldering. Other means exist to interconnect the light emitting devices 27.

As shown in FIGS. 2 and 3, apparatus 14 may include one or more clips 38 (designated in said Figures for illustration purposes as left-hand clip 38a and right-hand clip 38b) to provide a means for attaching and securing apparatus 14 to the main circuit board assembly 13. By making reference to FIGS. 2 and 3, it can be understood that left-hand clip 38a and right-hand clip 38b may be formed by folding under small extensions on the left and right hand sides respectively of substrate 23. Clips 38a and 38b are then wrapped around a portion of the main circuit board assembly 13 to hold apparatus 14 in place. It will be appreciated that the number and position of clips 38 will vary dependent upon the configuration of the maim circuit board assembly 13 of a particular portable communications device 11, or may be omitted altogether. Further, other means may be used in order to accomplish the objective, of securing the apparatus 14 to the main circuit board assembly 13. With reference to FIGS. 2 and 3, perforations 37 in substrate 23 are positioned to pass screws which may be used to secure other components of the portable communications device 11 to the main circuit board assembly 13.

In FIG. 2, first and second interconnection leads 28 and 29 are mounted on left-hand clip 38a. The first and second interconnection leads 28 and 29 have, respectively, first and second remote end terminals 31 and 32 extending away from substrate 23. In FIG. 3, first and second conductor terminals 31 and 32 are mounted on the folded under portion of left-hand clip 38a. Left-hand clip 38a provides an additional function of keeping first and second remote end terminal 31 and 32 in physical contact respectively with first and second contact points 21 and 22 of transducer power circuit 18. It should be understood that interconnection leads 28 and 29 and remote end terminals 31 and 32 may be mounted at other locations on substrate 23, or lead off of substrate 23 and not be mounted on substrate 23 at all.

It will be appreciated that a retrofit version of the invention, apparatus 14, is illustrated in FIGS. 2 and 3. A portable communications device 11 may be retrofitted with apparatus 14 so that a visual signal is produced upon ringing. As with the integrated version of the invention, the apparatus consists of a bus line 24 mounted on a substrate 23, the bus line 24 including a pair of conductors 26, a plurality of light emitting devices 27, and conductor means. The discussions applicable to the apparatus with respect to the integrated version of the invention are equally applicable to the retrofit version.

In order to retrofit a portable communications device 11 with apparatus 14, an outer cover 12 is removed, substrate 14 is positioned over the main circuit board assembly 13, remote end terminals 31 and 32 are placed in contact with contact points 21 and 22, and outer cover 12 is replaced and secured. The manner discussed for securing apparatus 14 in the integrated version is applicable to the retrofit version of the invention.

It will also be appreciated that means to connect bus line 24 to transducer power circuit 18, other than as shown in FIGS. 1, 2 and 3, for both the integrated and retrofit versions of the invention exist. First and second interconnection leads 28 and 29 may be longer or shorter than as shown, or may be physically integrated with first and second remote end terminals 31 and 32. Further, remote end terminals 28 and 29 may be flattened as shown, may be spring type terminals, or other type of electrical connectors. Further, it will be understood remote end terminals 31 and 32 may be constructed of conductive metal foil, as shown, or from other conductive material. Remote end terminals 31 and 32 may also be connected to contact points 21 and 22, respectively, by means of soldering to ensure that the electrical connection will be maintained.

FIG. 4 is a pictorial diagram of bus line 24 illustrating pair of conductors 26 with light emitting devices 27 interconnected along the pair of conductors 26 by means of soldering. Other means of interconnecting light emitting devices 27 exist. The number and placement of light emitting devices 27 is illustrative only, and many variations in number and patterns of placement exist. First and second interconnection leads 28 and 29, with first and second remote end terminals 31 and 32 are also shown. As previously discussed, the location of interconnection leads 28 and 29 and remote end terminals 31 and 32 is dependent upon the location of contact points 21 and 22 of transducer power circuit 18, as remote end terminals 31 and 32 are electrically connected to contact points 21 and 22.

In FIG. 5, a schematic diagram of the electrical circuitry of integrated version of the invention in combination with the transducer power circuit 18 of the main circuit board assembly 13 is illustrated. The transducer power circuit 18 is illustrated within the broken line, while the remainder of the schematic diagram in FIG. 5 consists of bus line 24. First remote end terminal 31 (of bus line 24) is connected to first contact point 21 (of transducer power circuit 18), and second remote end terminal 32 is connected to second contact point 22. The connection of bus line 24 with transducer power circuit 18 is thereby shown. When switch 19 turns on electrical current to ringing transducer 16 from power supply 17, electrical current also passes through bus line 24, thereby illuminating light emitting devices 27. The light emitting devices 27 shown are light emitting diodes. Other light emitting devices 27 exist, such as small incandescent lights. It will be appreciated that the light emitting devices 27 may be clear, white, or colored.

Figure 6:
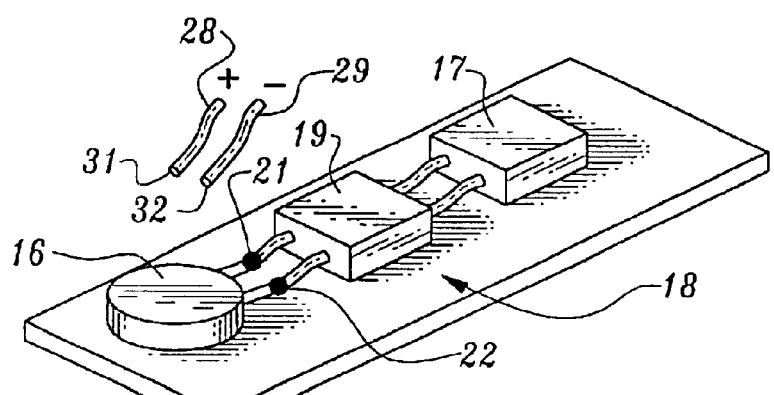
FIG. 6 is a pictorial diagram showing an alternative connection between the interconnections leads of the apparatus and the transducer power circuit of the main circuit board assembly.

FIG. 6 is a pictorial diagram showing an alternative connection the transducer power circuit 18 of a portable communications device 11 and the apparatus 14. The first and second interconnection leads 28 and 29, with first and second remote end terminals 31 and 32, are positioned to be connected to first and second contact points 21 and 22. Transducer power circuit 18 components: ringing transducer 16, power source 17, and switch 19 located therebetween, are also illustrated.

What is claimed is:

1. A portable communications device producing a visual signal upon ringing, comprising:

a. said portable communications device including an outer cover and a main circuit board assembly, said portable communications device further including a ringing transducer, a power source and a transducer power circuit extending therebetween, producing a ring tone which varies in frequency, amplitude and duration, said transducer power circuit having a portion physically exposed and electrically conductive to provide first and second contact points;

b. a substrate;

c. a bus line mounted on said substrate, said bus line including a pair of conductors;

d. at least one light emitting device connected to said pair of conductors; and e. first and second interconnection leads each respectively connected to one of said pair of conductors, said first and second interconnection leads having a portion extending away from said substrate and having first and second remote end terminals, and said first and second remote end terminals connected respectively to said first and second contact points.

2. A device as in claim 1 further including a display.

3. A device as in claim 1 further including call buttons.

4. A device as in claim 1 in which said outer cover is translucent.

5. A device as in claim 1 in which said substrate is essentially coextensive with the shape, size and configuration of said main circuit board assembly.

6. A device as in claim 1 in which said substrate is a thin, flexible material.

7. A device as in claim 6 in which said thin, flexible material is a plastic.

8. A device as in claim 1 in which said substrate is transparent.

9. A device as in claim 1 in which said substrate further includes means for securing said substrate to said main circuit board assembly.

10. A device as in claim 9, in which said means consists of at least one clip on said substrate.

11. A device as in claim 10, in which said clip means consists of a portion of said substrate which is folded under or over to form said clip.

12. A device as in claim 1, in which said first and second remote end terminals are sized and positioned to be in contact, respectively, with said first and second contact points.

13. A device as in claim 1, in which said substrate on which said bus line is mounted consists of a portion of said outer cover.

14. A device as in claim 1, in which said substrate on which said bus line is mounted consists of a portion of said main circuit board assembly.

15. A device as in claim 1, wherein said portable communications device is a cellular telephone.

16. A device as in claim 1, wherein said portable communications device is a paging device.

17. A device as in claim 1, wherein said portable communications device is a 2-way radio.

18. A device as in claim 1, in which said ringing transducer is a ringer.

19. A device as in claim 1, in which said ringing transducer is a buzzer.

20. A device as in claim 18, in which said ringing transducer is a speaker.

21. A device as in claim 18, in which said audible sounds produced are musical tones.

22. A device as in claim 1, in which said light emitting device is a light emitting diode.

23. A device as in claim 1, in which said light emitting device is an incandescent light.

24. A device as in claim 1, in which said light emitting device produces a clear light.

25. A device as in claim 1, in which said light emitting device produces a white light.

26. A device as in claim 1, in which said light emitting device produces a colored light.

27. A device as in claim 1, in which said light emitting device is illuminated through an opening in said outer cover.

28. A device as in claim 1, wherein said substrate further includes at least one cut-out portion.

29. A device as in claim 1, wherein said substrate further includes one or more holes.

30. A device as in claim 1, wherein said substrate further includes one or more perforations.

31. A device as in claim 1, wherein said bus line is mounted on said substrate by means of an adhesive tape placed over said bus ine.

32. A device as in claim 1, wherein said bus line is mounted on said substrate by means of placing said bus line between two laminated layers forming said substrate.

33. A device as in claim 1, wherein said bus ine is mounted on said substrate by means of a thin film placed over said bus line on said substrate.

34. A portable communications device producing a visual signal upon ringing, comprising:

a. said portable communications device including an outer cover and a main circuit board assembly, said portable communications device further including a ringing transducer, a power source and a transducer power circuit extending therebetween, producing a ring tone which varies in frequency, amplitude and duration, said transducer power circuit having a portion physically exposed and electrically conductive to provide first and second contact points;

b. a substrate;

c. a bus line counted on said substrate, said bus line including a pair of conductors connected to said first and second contact points;

d. at least one light emitting device connected to said bus line; and e. whereby, said light emitting device is illuminated by ringing of said portable communications device.

* * * * *